US010649733B2

(12) United States Patent
Anderson et al.

(10) Patent No.: US 10,649,733 B2
(45) Date of Patent: *May 12, 2020

(54) MULTIPLY ADD FUNCTIONAL UNIT CAPABLE OF EXECUTING SCALE, ROUND, GETEXP, ROUND, GETMANT, REDUCE, RANGE AND CLASS INSTRUCTIONS

(71) Applicant: Intel Corporation, Santa Clara, CA (US)

(72) Inventors: Cristina S. Anderson, Hillsboro, OR (US); Zeev Sperber, Zichron Yackov (IL); Simon Rubanovich, Haifa (IL); Benny Eitan, Haifa (IL); Amit Gradstein, Binyamina (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/436,901

(22) Filed: Jun. 10, 2019

(65) Prior Publication Data

US 2019/0361676 A1 Nov. 28, 2019

Related U.S. Application Data

(63) Continuation of application No. 15/469,919, filed on Mar. 27, 2017, now Pat. No. 10,318,244, which is a (Continued)

(51) Int. Cl.
*G06F 7/57* (2006.01)
*G06F 7/483* (2006.01)
(Continued)

(52) U.S. Cl.
CPC .............. *G06F 7/57* (2013.01); *G06F 5/01* (2013.01); *G06F 5/012* (2013.01); *G06F 7/483* (2013.01); *G06F 7/49947* (2013.01); *G06F 7/49957* (2013.01); *G06F 7/5443* (2013.01); *G06F 9/30014* (2013.01); *G06F 9/3893* (2013.01)

(58) Field of Classification Search
None
See application file for complete search history.

(56) References Cited

U.S. PATENT DOCUMENTS 5,598,362 A 1/1997 Adelman et al.
5,673,407 A 9/1997 Poland et al.
(Continued)

FOREIGN PATENT DOCUMENTS

CN 1928809 A 3/2007
JP S63189936 A 8/1988
(Continued)

OTHER PUBLICATIONS

Decision to Grant a Patent from foreign counterpart Japanese Patent Application No. 2013-530370, dated Dec. 16, 2014, 5 pages.
(Continued)

*Primary Examiner* — Michael D. Yaary
(74) *Attorney, Agent, or Firm* — NDWE, LLP

(57) ABSTRACT

A method is described that involves executing a first instruction with a functional unit. The first instruction is a multiply-add instruction. The method further includes executing a second instruction with the functional unit. The second instruction is a round instruction.

11 Claims, 9 Drawing Sheets

Figure 1:
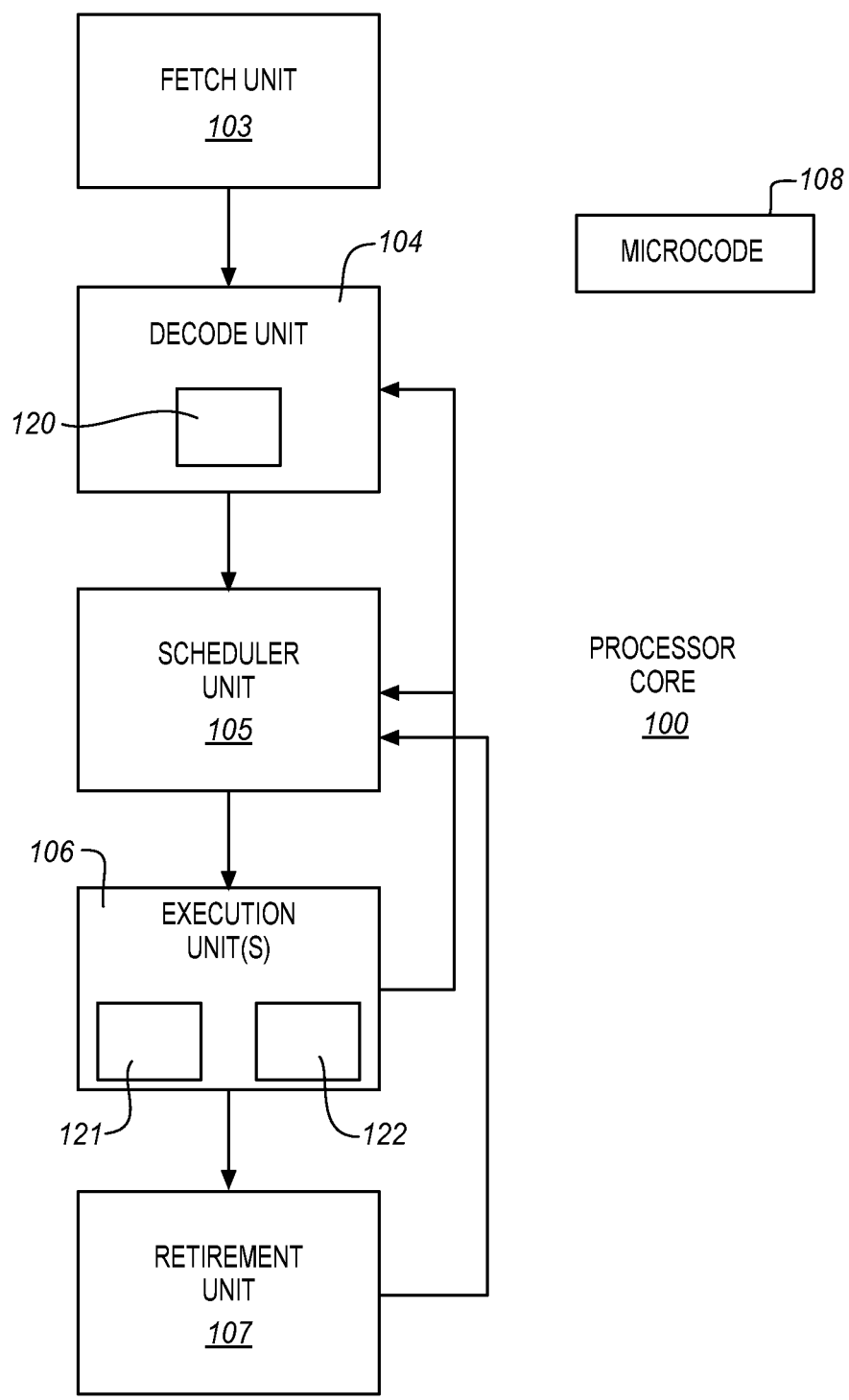

Related U.S. Application Data continuation of application No. 14/559,160, filed on Dec. 3, 2014, now Pat. No. 9,606,770, which is a continuation of application No. 12/890,543, filed on Sep. 24, 2010, now Pat. No. 8,914,430.

(51) Int. Cl.
| | | |
|---|---|---|
| *G06F 7/499* | (2006.01) | |
| *G06F 7/544* | (2006.01) | |
| *G06F 9/38* | (2018.01) | |
| *G06F 9/30* | (2018.01) | |
| *G06F 5/01* | (2006.01) | |

(56) References Cited

U.S. PATENT DOCUMENTS

| | | | |
|---|---|---|---|
| 6,360,189 | B1 | 3/2002 | Hinds et al. |
| 6,738,795 | B1 | 5/2004 | Colon-Bonet |
| 6,996,596 | B1 | 2/2006 | Ho et al. |
| 7,499,962 | B2 | 3/2009 | Tang et al. |
| 8,914,430 | B2 | 12/2014 | Gradstein et al. |
| 2006/0047738 | A1 | 3/2006 | Schwarz et al. |
| 2006/0136536 | A1 | 6/2006 | Lutz et al. |
| 2006/0184601 | A1 | 8/2006 | Trong et al. |
| 2008/0183791 | A1 | 7/2008 | Ho et al. |
| 2010/0058266 | A1 | 3/2010 | Boersma et al. |
| 2012/0079251 | A1 | 3/2012 | Gradstein et al. |
| 2015/0088947 | A1 | 3/2015 | Anderson et al. |

FOREIGN PATENT DOCUMENTS

| | | | |
|---|---|---|---|
| JP | H11353305 | A | 12/1999 |
| JP | 2002007111 | A | 1/2002 |
| JP | 2010503935 | A | 2/2010 |
| WO | 2008036944 | A1 | 3/2008 |
| WO | 2008096446 | A1 | 8/2008 |
| WO | 2012040632 | A2 | 3/2012 |
| WO | 2012040632 | A3 | 5/2012 |

OTHER PUBLICATIONS

Examination Report under Section 18(3) from foreign counterpart Great Britain Patent Application No. 1304865.7, dated May 25, 2018, 4 pages.
Final Office Action from U.S. Appl. No. 15/469,919, dated Jul. 3, 2018, 9 pages.
Final Office Action received for U.S. Appl. No. 12/890,543, dated Feb. 5, 2014, 9 pages.
Final Office Action received for U.S. Appl. No. 12/890,543, dated Sep. 16, 2013, 9 pages.
International Preliminary Report on Patentability for Application No. PCT/US2011/053094 dated Apr. 4, 2013, 7 pages.
International Search Report and Written Opinion for Application No. PCT/US2011/053094 dated Mar. 27, 2012, 10 pages.
Non-Final Office Action received for U.S. Appl. No. 12/890,543, dated Apr. 2, 2013, 8 pages.
Non-Final Office Action received for U.S. Appl. No. 14/559,160, dated Jan. 22, 2016, 8 pages.
Non-Final Office Action received for U.S. Appl. No. 15/469,919, dated Oct. 10, 2017, 6 pages.
Notice of Allowance from U.S. Appl. No. 15/469,919, dated Jan. 24, 2019, 7 pages.
Notice of Allowance received for Chinese Patent Application No. 201180045896.X, dated Aug. 29, 2016, 4 pages of Notice of Allowance including 2 Pages of English Translation.
Notice of Allowance received for Taiwan Patent Application No. 100134351, dated Apr. 27, 2016, 2 pages of Notice of Allowance.
Notice of Allowance received for U.S. Appl. No. 12/890,543 dated Aug. 13, 2014, 11 pages.
Notice of Allowance received for U.S. Appl. No. 14/559,160, dated Nov. 7, 2016, 6 pages.
Office Action received for Chinese Patent Application No. 201180045896.X, dated Dec. 31, 2014, 9 pages of English Translation and 11 pages of Chinese Office Action.
Office Action received for Chinese Patent Application No. 201180045896.X, dated Mar. 1, 2016, 4 pages of English Translation and 3 pages of Chinese Office Action.
Office Action received for Germany Patent Application No. 112011103206.4, dated Apr. 17, 2015, 4 pages of English Translation and 6 pages of German Office Action.
Office Action received for Japanese Patent Application No. 2013-530370, dated Mar. 11, 2014, 2 pages of English Translation and 2 pages of Japanese Office Action.
Office Action received for Korean Patent Application No. 10-2013-7007355, dated Apr. 23, 2014, 3 pages of English Translation and 4 pages of Office Action.
Office Action received for Korean Patent Application No. 10-2013-7007355, dated Jan. 30, 2015, 3 pages of English Translation 4 pages of Korean Office Action.
Office Action received for Taiwan Patent Application No. 100134351, dated Jul. 6, 2015, 6 pages of English Translation and 6 pages of Taiwan Office Action.
Second Office Action from foreign counterpart Chinese Patent Application No. 201180045896.X, dated Aug. 19, 2015, 8 pages.
Sweetman D., "MIPS Run Linux," Elsevier, 2007, pp. 213-215.

US 10,649,733 B2

MULTIPLY ADD FUNCTIONAL UNIT CAPABLE OF EXECUTING SCALE, ROUND, GETEXP, ROUND, GETMANT, REDUCE, RANGE AND CLASS INSTRUCTIONS

CROSS REFERENCE TO RELATED APPLICATIONS

This application is a Continuation of U.S. patent application Ser. No. 15/469,919, entitled, "MULTIPLY ADD FUNCTIONAL UNIT CAPABLE OF EXECUTING SCALE, ROUND, GETEXP, ROUND, GETMANT, REDUCE, RANGE AND CLASS INSTRUCTIONS" filed on Mar. 27, 2017, which is a Continuation of U.S. patent application Ser. No. 14/559,160, entitled, "MULTIPLY ADD FUNCTIONAL UNIT CAPABLE OF EXECUTING SCALE, ROUND, GETEXP, ROUND, GETMANT, REDUCE, RANGE AND CLASS INSTRUCTIONS" filed on Dec. 3, 2014, now U.S. Pat. No. 9,606,770 Issued on Mar. 28, 2017, which is a Continuation of U.S. patent application Ser. No. 12/890,543, entitled, "MULTIPLY ADD FUNCTIONAL UNIT CAPABLE OF EXECUTING SCALE, ROUND, GETEXP, ROUND, GETMANT, REDUCE, RANGE AND CLASS INSTRUCTIONS" filed on Sep. 24, 2010, now U.S. Pat. No. 8,914,430, Issued on Dec. 16, 2014, which is hereby incorporated herein by reference in its entirety and for all purposes.

FIELD OF INVENTION

The field of invention relates generally to electronic computing and more specifically, to a functional unit capable of executing approximations of functions.

BACKGROUND

FIG. 1 shows a generic processing core 100 that is believed to describe many different types of processing core architectures such as Complex Instruction Set (CISC), Reduced Instruction Set (RISC) and Very Long Instruction Word (VLIW). The generic processing core 100 of FIG. 1 includes: 1) a fetch unit 103 that fetches instructions (e.g., from cache and/or memory); 2) a decode unit 104 that decodes instructions; 3) a schedule unit 105 that determines the timing and/or order of instruction issuance to the execution units 106 (notably the scheduler is optional); 4) an execution stage 106 having execution units that execute the instructions (typical instruction execution units include branch execution units, integer arithmetic execution units (e.g., ALUs) floating point arithmetic execution units (e.g., FPUs) and memory access execution units); and 5) a retirement unit 107 that signifies successful completion of an instruction. Notably, the processing core 100 may or may not employ microcode 108. In the case of micro-coded processors, the micro-ops are typically stored in a non volatile machine readable medium (such as a Read Only Memory (ROM)) within the semiconductor chip that the processor is constructed on and cause the execution units within the processor to perform the desired function called out by the instruction.

FIGURES

Figure 2:
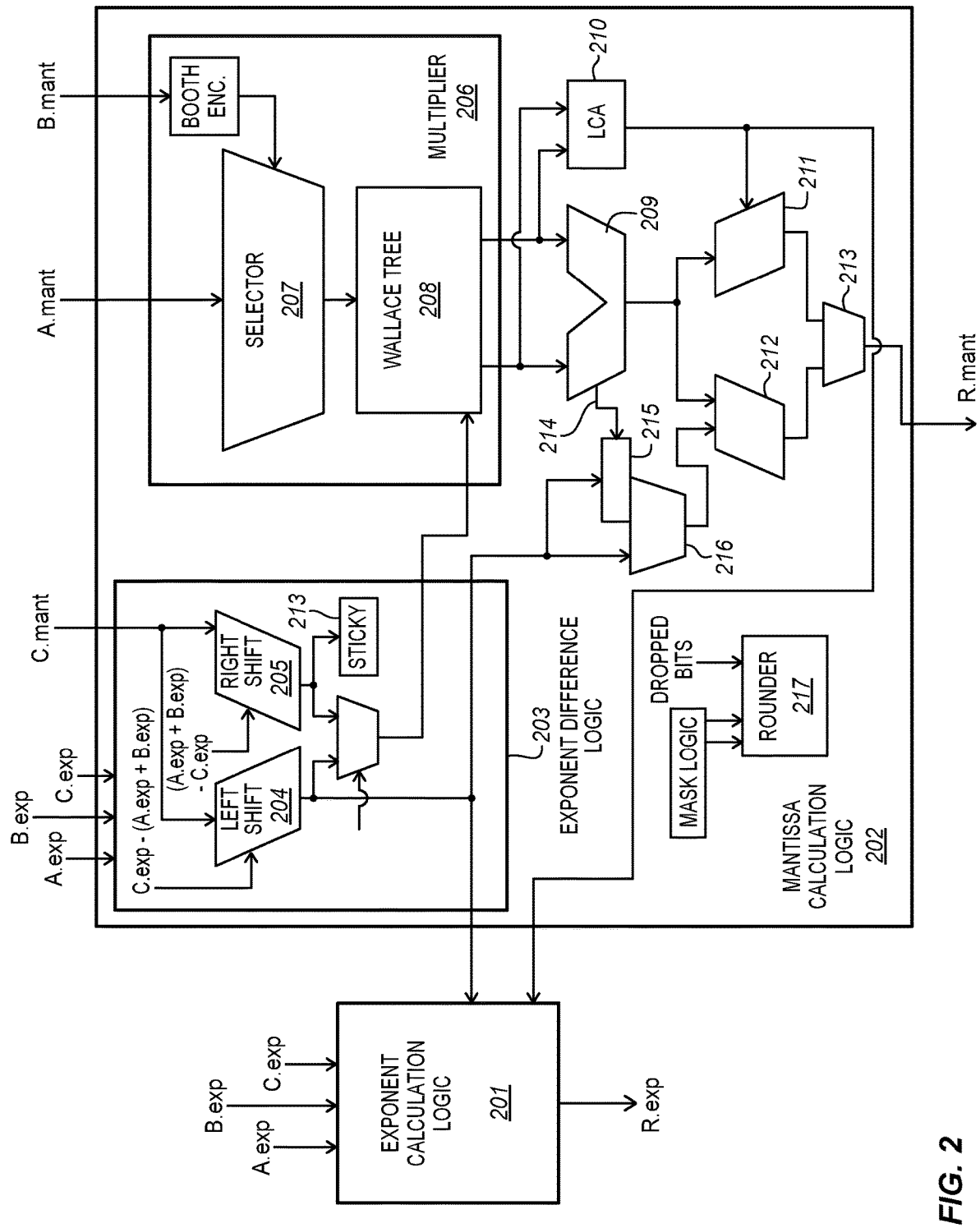
Figure 3:
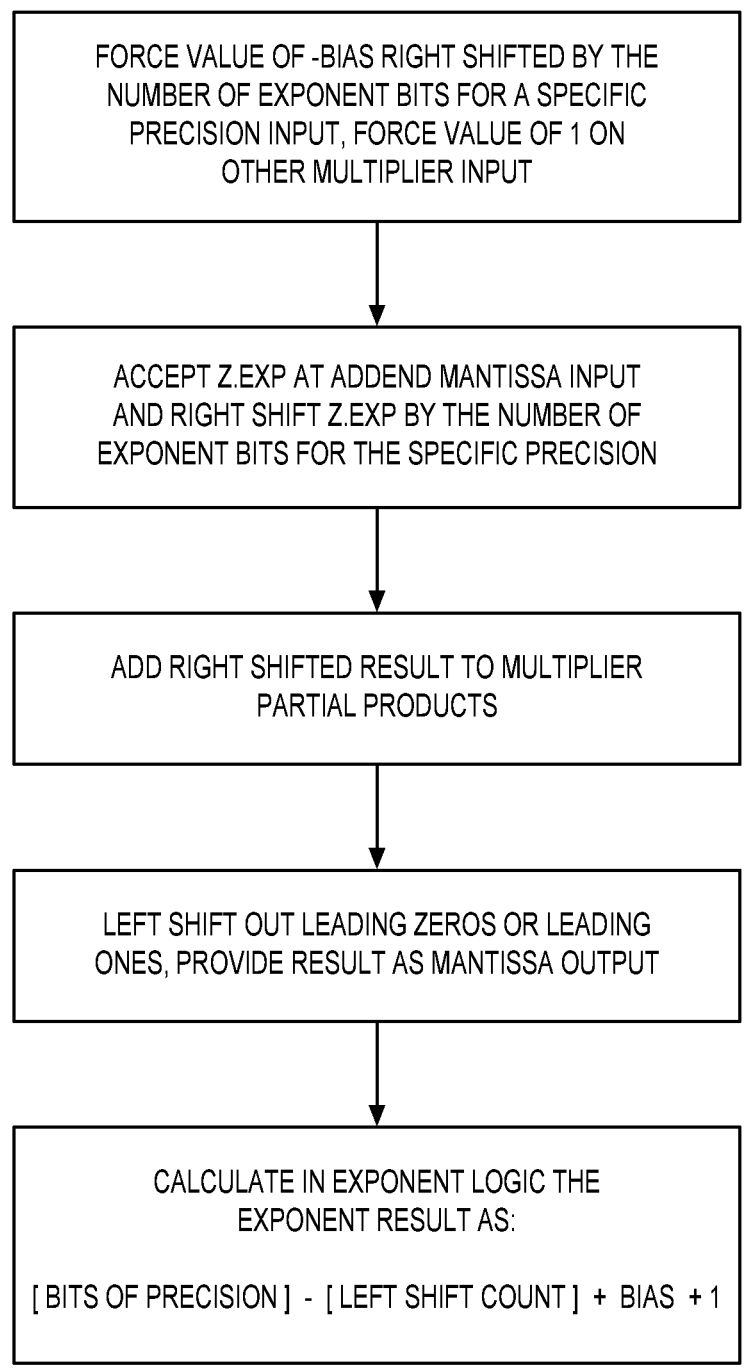
Figure 4:
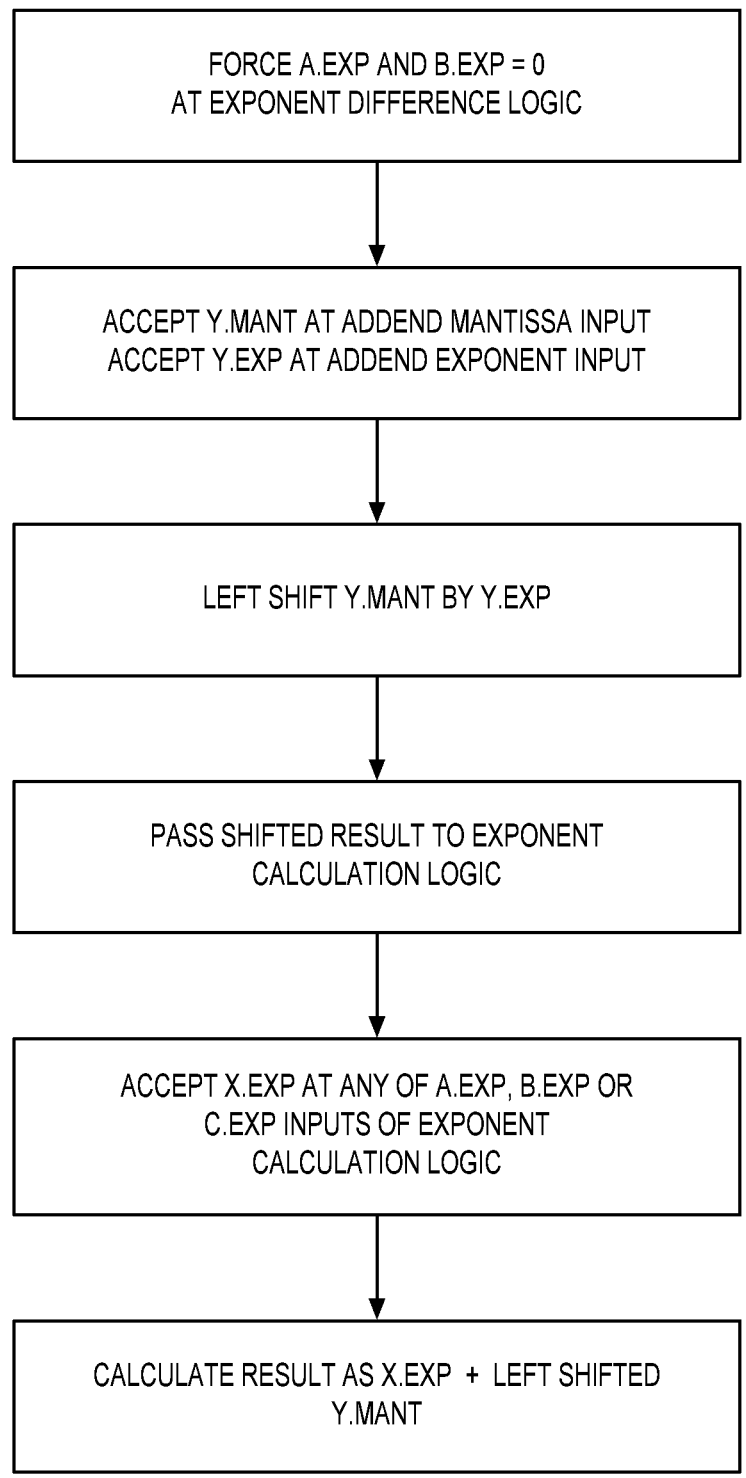
Figure 5:
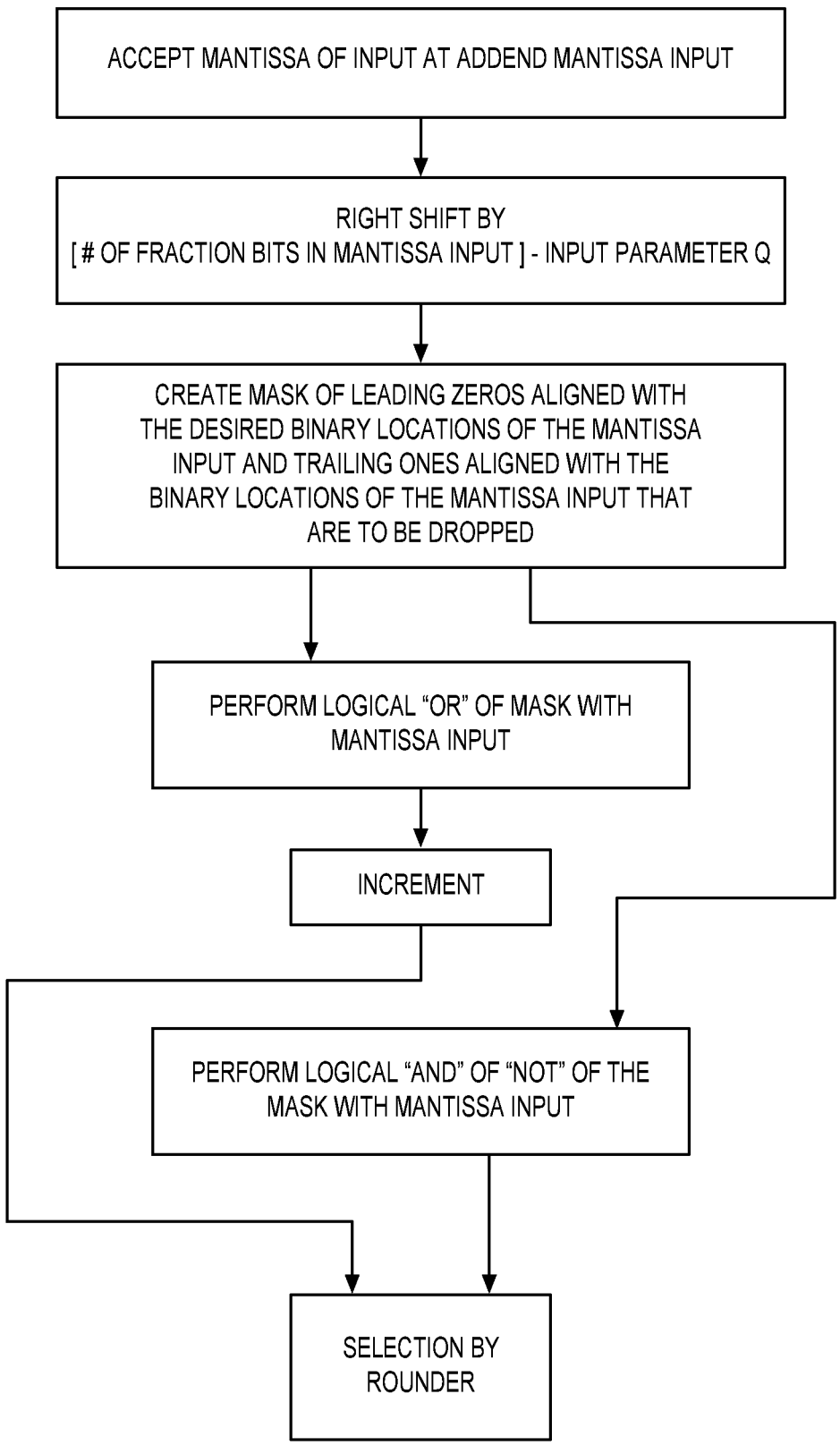
Figure 6:
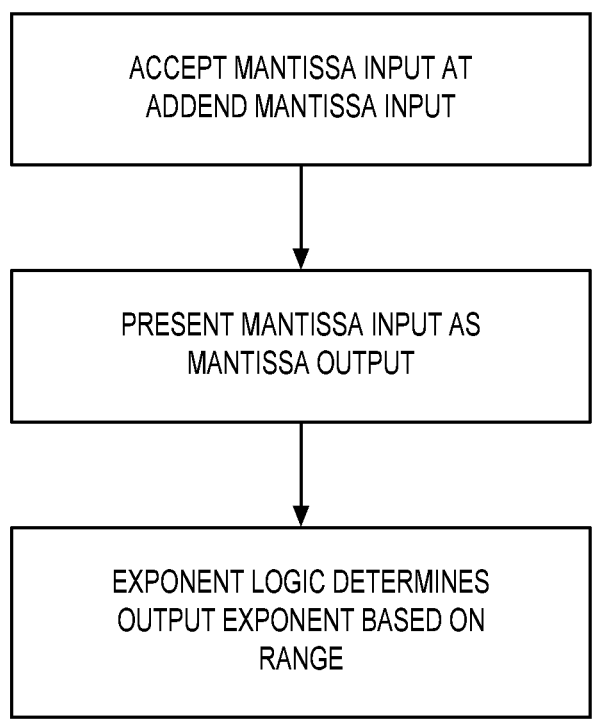
Figure 7:
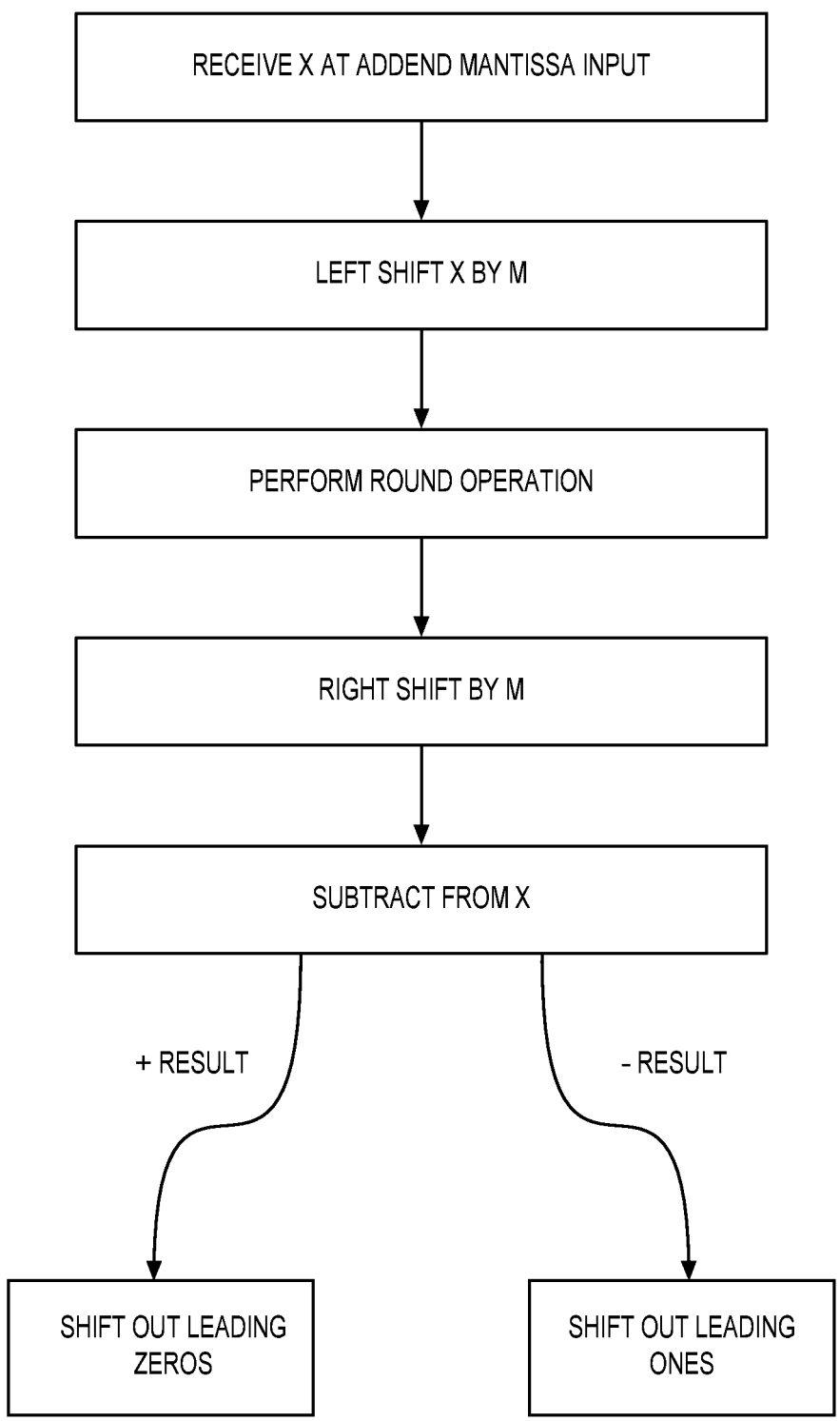
Figure 8:
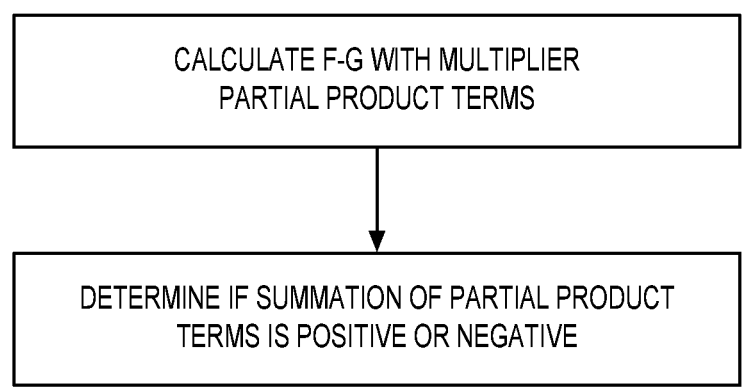
Figure 9:
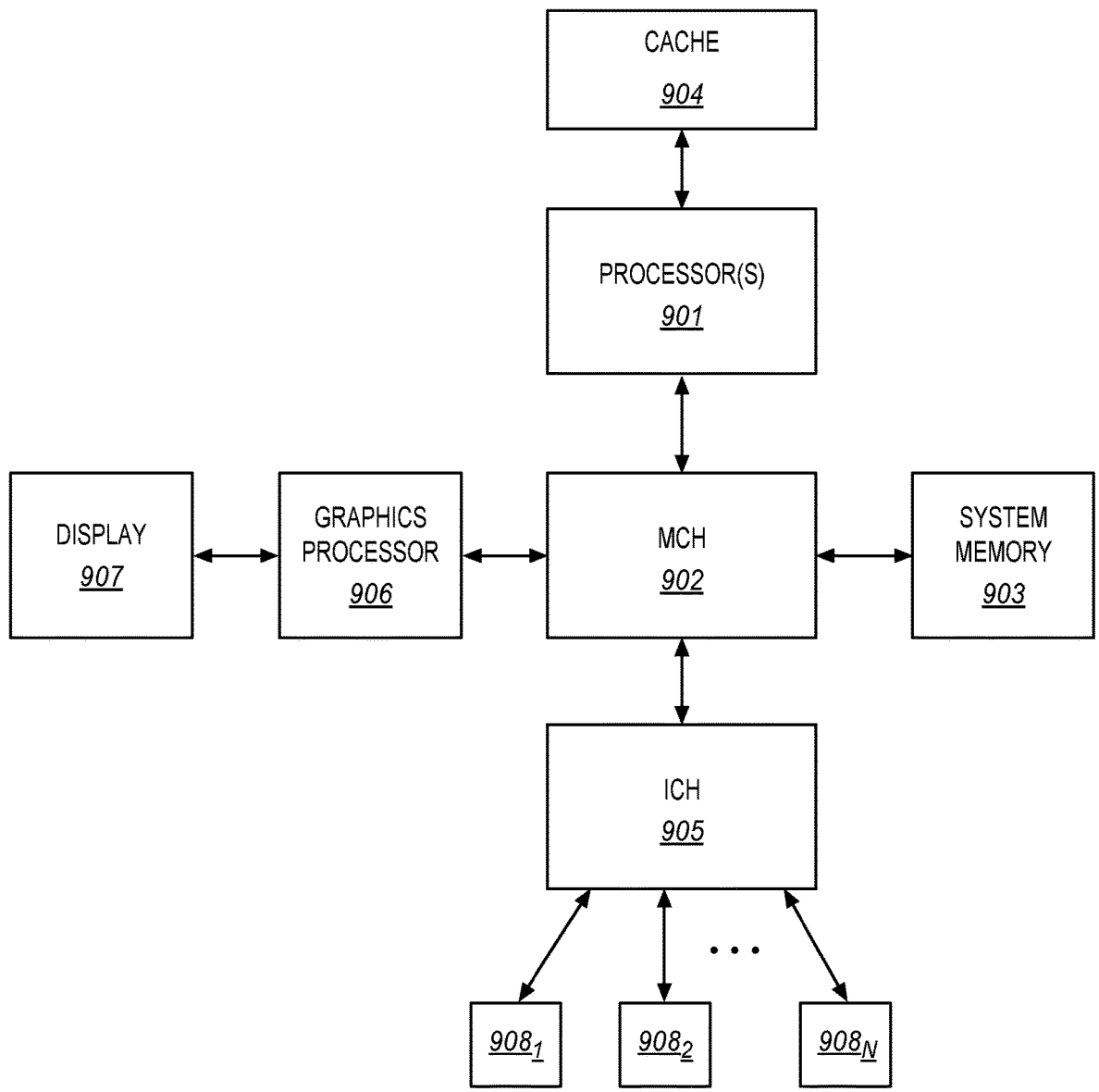

The present invention is illustrated by way of example and not limitation in the figures of the accompanying drawings, in which like references indicate similar elements and in which:

FIG. 1 shows an embodiment of a processor;
FIG. 2 shows an embodiment of a multiply add functional unit;
FIG. 3 shows a flow diagram of a GETEXP instruction that is operable on the functional unit of FIG. 2;
FIG. 4 shows a flow diagram of a SCALE instruction that is operable on the functional unit of FIG. 2;
FIG. 5 shows a flow diagram of a ROUND instruction that is operable on the functional unit of FIG. 2;
FIG. 6 shows a flow diagram of a GETMANT instruction that is operable on the functional unit of FIG. 2;
FIG. 7 shows a flow diagram of a REDUCE instruction that is operable on the functional unit of FIG. 2;
FIG. 8 shows a flow diagram of a RANGE instruction that is operable on the functional unit of FIG. 2;
FIG. 9 shows an exemplary computing system.

DETAILED DESCRIPTION

FIG. 2 shows an execution unit (also referred to as a functional unit) that is capable of executing a number of different instructions described herewith.

MADD Instruction

A basic instruction that the architecture of FIG. 2 is capable of executing is a multiply add (MADD) instruction which multiplies a multiplicand (A) and multiplier (B) and adds the product (AB) to an added (C). That is, the MADD instruction executes the instruction R=(AB)+C (in an embodiment, the MADD instruction can be used to perform any of the following calculations: AB+C, AB−C, −AB+C, −AB−C). In floating point form, as is known in the art, a value can be expressed with a mantissa term and an exponent term. Thus, for instance, multiplicand A is expressed as (A.mant, A.exp); multiplier B is expressed as (B.mant, B.exp) and addend C is expressed as (C.mant; C.exp).

The architecture of FIG. 2 includes, for floating point operations, exponent calculation logic 201 and mantissa calculation logic 202. According to basic operation of a floating point MADD instruction, the exponent calculation logic 201 determines the exponent term of the floating point result (R.exp) and the mantissa calculation logic 202 determines the mantissa term of the floating point result (R.mant). For the floating point MADD instruction, the exponent calculation logic 201 initially determines the R.exp term as the maximum of: i) C.exp; ii) (A.exp+B.exp).

The mantissa logic 202 includes exponent difference logic 203 which includes both left shift logic 204 and right shift logic 205. The mantissa logic also includes a multiplier 206. The act of multiplication can be viewed as the summation of a number of partial products. FIG. 2 also shows a specific multiplier design approach in which selector logic 207 generates partial products of the multiplication of the A.mant term and the B.mant term (note that the B.mant term is also Booth encoded). Wallace tree logic 208 effectively performs the summation of the partial products produced by the selector logic 207. Notably, the addend mantissa term (C.mant) is injected into the Wallace tree 208 so that the Wallace tree 208 also performs the AB+C addition.

Prior to the injection, however, the C.mant term is adjusted so that it is properly aligned within the partial product summation. Here, because the multiplication performed by the multiplier naturally produces a mantissa term that is of the order A.exp+B.exp, the exponent difference logic 203 will shift the C.mant term by the difference between C.exp and (A.exp+B.exp). Specifically, if C.exp is greater than (A.exp+B.exp), the C.mant term will be shifted to the left by C.exp−(A.exp+B.exp) binary points by left shift logic 204 (that is, the binary point of the C.mant term will be shifted to the right which has the effect of increasing its integer term). Likewise, if C.exp is less than (A.exp+B.exp), the C.mant term will be shifted to the right by (A.exp+B.exp)−C.exp decimal points by right shift logic 205 (that is, the binary point of the C.mant term will be shifted to the left which has the effect of decreasing its integer term). In this case, lower order fractional terms of C.mant are combined into a sticky bit by logic 213, to be used by a rounder 217 for instructions described further below.

The summation performed by the Wallace tree logic 207 produces both a summation term and a carry term which are added by adder 209 to produce a result for the AB+C calculation. Here, if the result of the AB+C calculation contains leading zeroes (or leading ones if the result is negative), leading change anticipator 210 will cause the result to be shifted to the left (by left shifter 211) by the number of leading zeroes/ones to remove them. This same information is provided to the exponent calculation logic 201 to adjust R.exp accordingly.

There are two shifters, Shift left 204 to remove leading zeros/ones (in which case R.exp is updated with a shift_count) and a shift right 212 (which is needed when C.exp is bigger than A+B.exp, in which case the Wallace tree result is right shifted to the point which equals C.exp−(A+B.exp)). Mux 213 selects whichever of the two shifters 211, 212 were utilized to effect the correct result. In an embodiment, if the C.mant term is shifted to the left, adder 209 may generate a carry term 214. The carry term 214 enables an incrementer 215 which effectively adds the carry term to the left shifted C.mant term (that is, the output of the incrementer 215 flows through the 2:1 multiplexer 216 if adder 209 generates a carry term). In an embodiment the adder 209 is 108 bits and the incrementer 215 is a 53 bit incrementer.

A number of additional instructions that can be executed on the functional unit of FIG. 2 are described in further detail below. For any of these instructions, as well as the aforementioned FMADD instruction, in an embodiment, the functional unit is designed to operate on any combination of scalar or packed data (SIMD) styled operands, and, in single precision or double precision. The specification combination of operand style and precision is specified in the instruction. Moreover, the functional unit of FIG. 2 can be instantiated multiple times to effect a vector functional unit. Here, a masking layer may be imposed between the vector functional unit output and each of the instantiated functional units within the vector functional unit.

Vector operation can be viewed as being distinctive from SIMD operation in the sense that the dimension of the input operand is variable for vector machines but is fixed for SIMD machines. The aforementioned masking layer provides the ability to vary the number of elements in the vector machine. Specifically, each output element from one of the instantiated functional units may be written to with its own respective write logic circuitry. In an embodiment, the write logic circuitry can write to any output element location of the vector functional unit. By enabling the write logic circuitry only for those elements that correspond to a valid vector operand element, variable length vectors can be processed. This has the effect of essentially enabling for operation only those of the instantiated functional units that correspond to a valid vector element. Furthermore, the masking layer may be designed such that any arithmetic exceptions detected by the individual instantiated functional units are presented for valid output only for the enabled instantiated functional units while suppressing exceptions from the inactivated ones.

SCALE Instruction

A flow diagram of the SCALE instruction is shown in FIG. 3. The SCALE instruction scales a first floating point term X by floor:Y (which is the lowest integer expression of floating point term Y) The VSCALE instruction, in effect, can be viewed as an instruction that moves the binary point of X by an amount floor: Y. In mathematical terms, this may be expressed as $$R=(X.\text{mant } E \text{ } X.\text{exp})*2^{\wedge}(\text{floor: } Y.\text{mant } E$$
$$Y.\text{exp})=X.\text{mant } E \text{ } (X.\text{exp}+(\text{floor: } Y.\text{mant } E$$
$$Y.\text{exp})).$$

Thus the mantissa term of the result is R.mant=X.mant, and, the exponent term of the result is R.exp=X.exp+(floor: Y.mant E Y.exp). With respect to the calculation of R.exp, note that the X.exp term is by itself an integer, and, Y.mant E Y.exp can be converted into an integer simply by shifting the binary point of the Y.mant term until there are no more fractional bits. That is, for example, if Y.mant=1.01011 and Y.exp=5, then, Y=101011. This essentially corresponds to shifting Y.mant within a shifter to the left by Y.exp. Here, the floor operation essentially corresponds to the dropping of the fractional bits. Thus, the R.exp term can be calculated by: i) shifting Y.mant by an amount equal to Y.exp; and, ii) adding the shifted value to X.exp.

This can be accomplished within the exponent difference logic 203 of FIG. 2 by processing the Y term with the data path that processes the addend term of the MADD instruction (C.mant and C.exp) while forcing the A.exp and B.exp terms=0. In this case, C.exp−(A.exp+B.exp)=Y.exp−(0)=Y.exp, which, will cause Y.mant to be shifted by left shifter 204 to the left by Y.exp. The output of shifter 204 is then provided to exponent calculation logic 201 which adds the output of shifter 204 to the X.exp term. The X.exp term may be forced upon any of the A.exp, B.exp, C.exp inputs to the exponent calculation logic 201. The summation is provided as R.exp. R.mant is simply provided as the input X.mant term.

GETEXP Instruction

A flow diagram of the GETEXP instruction is shown in FIG. 4. The GETEXP instruction accepts an input term (Z.mant, Z.exp), subtracts the bias from the value of Z.exp and provides the answer in floating point form. Essentially the instruction provides the true exponent of input Z in floating point form. Here, as is known in the art, floating point exponent values are typically biased to make calculations involving negative exponents easier. For example, in the case of single precision, 8 bits are reserved for the exponent term which gives a range of 254 different values (special meaning is given to two other values). Here, for an actual exponent range of −127 to +127, a bias of +127 is added by hardware to any such actual exponent value so that the numerical range that is physically calculated in hardware for the exponent extends from 0 to 254. Thus, for single precision, the GETEXP instruction subtracts a value of 127 from Z.exp and provides the answer in floating point form. In the case of double precision a value of 1023 is subtracted from Z.exp (noting that double precision has 11 bits in the .exp term).

In the case of single precision, a value of 127 is subtracted from another term by adding a value of −127. In two's complement integer form, −127 can be expressed as 10000001 which can be re-aligned as 0.10000001 E 8 (i.e., if the value 10000001 E 0 is shifted to the right by eight decimal places). As such, according to one approach, for single precision, a value of 0.10000001 is forced as the multiplicand (A.mant) and a value of 1 is forced as the multiplier (B.mant), the result from the multiplication of the AB terms as performed by the multiplier is 0.10000001 which corresponds to −127 shifted to the right by eight places.

The Z.exp term is accepted along the addend (C.mant) data path and is also right shifted by the right shifter 205 eight places to align it with the multiplier output before it is injected into the Wallace tree 208. The result from adder 209 corresponds to the Z.exp term less the bias of 127 and shifted to the right eight places. The leading change anticipator 210 and left shifter 211 will remove any leading zeroes/ones and the result is provided as R.mant. R.exp is calculated by the exponent calculation logic, again for single precision, as R.exp=8−(leading zeros/ones count from LCA 210)+127+1. For double precision, the same operation described above applies except that the bias is 1023 and the values are shifted by 11 bits instead of 8 bits. As such, R.exp=11−(leading zero count from LCA 210)+1023+1.

In the case where the input term (Z.mant, Z.exp) is denormal (i.e., has a biased exponent term of zero and a nonzero mantissa of the form 0.XXXX . . . X), the Z.mant term is left shifted by left shifter 211 under the control of LCA 210 until the first leading 1 is found. The result is provided as R.mant. The left shift count corresponds to the absolute value of the exponent which is also understood to be negative. Thus, R.exp is presented by the exponent calculation logic as R.exp=−lleading zeros count from LCA 210.

ROUND Instruction

A flow diagram of the ROUND instruction is shown in FIG. 5. The ROUND instruction rounds the mantissa S.mant of an input term (S.mant; S.exp) to a number of binary places specified by an input term Q. For example, if S=10111.11001 E 0 and Q=2, the instruction will provide a result R=10111.11 E 0 (i.e., R.mant=10111.11; R.exp=0). In order to effect this operation, the S.mant term is accepted as the addend mantissa input (C.mant) and is right shifted by right shifter 205 an amount=(# of fraction bits in S.mant)−Q.

In the example provided above, the number of fraction bits in S.mant is 5 (i.e., there are five bits in the string "11001"). Thus, S.mant is shifted right by 5−Q=5−2=3 places. Shifting the input S.mant term of 10111.11001 to the right by 3 places produces a result that corresponds to 10.11111 E 3 which has the effect of dropping the lowest ordered fractional bit string "001" from the original input S. In an embodiment, the instruction supports the following round modes: 1) round up; 2) round down; 3) round to nearest even number; and, 4) round to zero.

Complete operation rounds the smallest fractional value up or down depending on the specified rounding mode and the fractional bits that were dropped, and, presents the result with the original exponent (i.e., 10111.11 E 0). Here, a mask is created that includes leading 0 s aligned with the part of the original S.mant that is kept concatenated with trailing 1s that are aligned with the part of the original S.mant term that is dropped. In the example being discussed herein, this corresponds to 0000000111. The mask is ORed with the original S.mant input to produce, for the example, a first value of 1011111111. The NOT of the mask (1111111000) is ANDed with the original input S.mant term to produce, a second value of 1011111000. A rounder 217 receives both values and increments the first value which corresponds to a rounded up value. The second value corresponds to a non rounded up value. The first or second value will be chosen as the correct mantissa answer based on specified rounding mode and the bits that were dropped from the right shifter 205. In this example, the dropped bits correspond to "001", therefore a round up should not occur (in round-to-nearest mode) and the second value is chosen as the correct mantissa. In the case of round up mode (and input sign is positive), or round-down mode (and input sign is negative), the rounded up value is selected. The non rounded up value is always chosen in round-to-zero mode. The exponent calculation logic determines the correct exponent (e.g., consider S=11111.11111 E 0 and Q=2 in round-to-nearest mode: after normalization, R.exp=S .exp+1).

Notably, one of the first and second values corresponds to an even mantissa value and the other an odd mantissa value. In the case of round to nearest even number, selection is based on the leftmost dropped bit and the OR of the other dropped bits (sticky bit). If the leftmost dropped bit is 1 but the sticky bit is 0, the even value is selected. If the sticky bit is 1, selection is based on leftmost dropped bit: if 1, select rounded-up value; if 0, select truncated value (i.e. non rounded up). In the case of round-to-infinity, the rounded up value is chosen if any of the dropped fraction bits are 1; else, the non rounded up value is chosen if all dropped bits are 0. In an embodiment, the round-to-infinity rule is applied for negative inputs in round-down mode and for positive inputs in round-up mode. The round-to-zero rule is applied to positive inputs in round-down mode and negative inputs in round-up mode. The described rounding behavior is in agreement with the rounding mode definitions given in IEEE Std 754-2008.

GETMANT

A flow diagram of the GETMANT instruction is shown in FIG. 6. GETMANT provides the value of a mantissa in floating point form. The mantissa that is to expressed in floating point form is accepted at the C.mant input. The mantissa portion of the result (hereinafter referred to as the "significand") is made to be of the form 1.XXXX . . . X. A numerical range that the output value must fall within (also referred to as a normalization value) is also provided as an input parameter. According to an embodiment, there are four intervals that can be specified: [1, 2); [1/2, 1); [1/2, 2); and, [3/4, 3/2).

A range of [1, 2) corresponds to an output binary number of the form 1.XXXX . . . X. In the case where the C.mant input is of the form 1.XXX . . . X, the C.mant input term is simply presented as the output result. The exponent logic sets the exponent result as 0 (or BIAS) to present the output value within the correct range.

A range of [1/2, 1) corresponds to an output binary number of the form 0.1XXXX . . . X. In the case where the C.mant input is of the form 1.XXX . . . X, the C.mant input term is simply presented as the output mantissa result. The exponent result is presented as −1 (or BIAS −1) to provide the output value within the specified range (i.e., a numerical number of the form 0.1XXXX . . . X).

A range of [1/2, 2) corresponds to an output binary number of the form 0.1XXX . . . X or 1.XXXX . . . X. In the case where the C.mant input is of the form 1.XXX . . . X, the C.mant input term is simply presented as the output mantissa result. If the C.mant input term is of the form 0.1XXX . . . X, the exponent is presented as −1 (or BIAS −1) to provide the output result in the correct numerical range. If the C.mant input term is of the form 1.XXXX . . . X, the exponent is presented as 0 (or BIAS) to provide the output result in the correct numerical range.

A range of [3/4, 3/2) corresponds to an output binary number of the form 0.11XXX . . . X or 1.0XXX . . . X. In the case where the C.mant input is of the form 1.XXX . . .

X, the C.mant input term is simply presented as the output mantissa result. If the C.mant input term is of the form 1.0XXX . . . X, the exponent is presented as 0 (or BIAS) to provide the output result in the correct numerical range. If the C.mant input term is of the form 1.1XXX . . . X, the exponent is presented as −1 (or BIAS −1) to provide the output result in the correct numerical range.

For any of the above instructions where the input term is denormal (i.e., has a biased exponent term of zero and a nonzero mantissa of the form 0.XXXX . . . X), the C.mant term is left shifted by left shifter 211 under the control of LZA 210 until the first leading 1 is found, which, in turn, corresponds to representing the output in the form of 1.XXXX . . . X (which is the desired output form). The correct exponent is then established as described above for the particular range that applies.

REDUCE

A flow diagram of the REDUCE instruction is shown in FIG. 7. REDUCE extracts the reduced argument of an input value according to the relationship $R=X-\text{Round}(2^M X)2^{-M}$. Here, M is a scaling factor that determines the bit position where the extraction is referenced from. An input value also specifies whether the Round operation is a round up, a round down or a round to nearest even. For example, if X=1.01010101 and a round down is specified with a scaling factor of 3, $\text{Round}(2^3 X)=1010.00000$ and $\text{Round}(2^3 X)2^{-3}=1.01000000$. Thus, $X-\text{Round}(2^M X)2^{-M}=1.01010101-1.01000000=0.00010101$. In this case, R will be expressed as 1.0101 with an exponent of zero.

Referring to FIG. 2, control logic (not shown) receives the scaling parameter M provided as an input with the instruction. The value X is received at the C.mant.input and is left shifted by left shifter 204 under the control of the control logic. Specifically, the control logic causes the left shifter 204 to left shift the value X a number of binary places equal to the scaling parameter M. This produces the $2^M X$ term. Operation then proceeds as described above with respect to the ROUND instruction with the exception that right shifter 205 is not used because, for the present operation, the Q parameter of the ROUND instruction is 0.

In an embodiment, the rounder 217 is capable of receiving as another input parameter from the instruction an indication whether it is supposed to round up, round down, or round to the nearest even number. Operation of the rounder for these different modes is as described above for the ROUND instruction.

When the rounded answer is provided by the rounder 217, it is right shifted by right shifter 205 by a number of decimal places equal to the scaling parameter M (notably, the rounder 217 output is coupled to the right shifter 205 input). The output of right shifter 205 corresponds to $\text{Round}(2^M X)2^{-M}$ and is passed to the Wallace tree 209 with appropriate sign manipulation to effect its negative representation. The multiplier receives the same input value received at the C.mant input at one of it's A.mant or B.mant inputs and the other input is fixed at a value of 1. Thus, adder 209 provides $X-\text{Round}(2^M X)2^{-M}$. In the case of a round up, the adder 209 result will be negative or zero. If the result is negative, the LCA will cause the left shifter 211 to shift out leading 1 s. In the case of a round down, the adder 209 result will be positive or zero. If the result is positive, the LCA will cause left shifter 211 to shift out leading zeros. In the case of a round to nearest even number, the adder result could be negative, positive or zero. The LCA 209 will cause the appropriate shift as described just above for positive and negative results. The output is then provided from the functional unit.

RANGE

A flow diagram of the RANGE instruction is shown in FIG. 8. The RANGE instruction accepts two values F and G and returns any of: i) the minimum value of F and G; ii) the maximum value of F and G; iii) the minimum of the absolute value of F and the absolute value of G; and iv) the maximum of the absolute value of F and the absolute value of G. In an embodiment, a specific one of determinations i) through iv) is identified in the instruction for execution. Referring to FIG. 2, in an embodiment, for instructions i) and ii) above, F is provided at the C.mant input and G is provided at the A.mant input. The B.mant input is forced to a value of 1.0. The sign term for G is switched to effect a calculation F-G through the Wallace tree and adder 209. The sign term for the output of adder 209 signifies which of F and G is larger. Specifically, if the sign term is positive F is larger, or, if the sign term is negative G is larger. Thus, F is routed as the output in the former case and G is routed as the output in the later case. Instructions iii) and iv) operate similarly accept that the sign terms for the F and G values are taken to be positive values prior to their submission to the multiplier.

CLASS

The CLASS instruction determines an operand's type. In an embodiment, the instruction corresponds to a test for a plurality of different data types and a special output format that essentially reserves a bit location for each type, and, if the operand is of one of the specific tested for types, the functional unit places a 1 in the bit location of the output that corresponds to that type. In a further embodiment, there are eight different data types that are tested for. These are; i) QNaN; ii) Negative Finite; iii) Denormall; iv) negative infinity; v) positive infinity; vi) negative zero; vii) positive zero; viii) SNAN. In an embodiment, control logic within the functional unit (not shown in FIG. 2) makes the determination for an operand presented at the C.mant input and crafts the special output result in response.

BLENDSEM and FIXUPIMM

This BLENDSEM instruction conditionally merges the sign, exponent and mantissa of packed double-precision floating point values in second source operand and, sign, exponent and mantissa from packed double-precision floating point values in first source operand according to the corresponding immediate bits [7:0]. The resulted packed double-precision floating point value is stored in destination register. The immediate bits [7:0] determine whether the corresponding sign, exponent and mantissa from the single-precision values in second source operand or in first source operand has to be copied to destination. Special values are also manipulated based on the immediate control.

The FIXUPIMM instruction performs an element-by-element fix-up of various real and special number types in a float64 vector zmm2 using 32-bit table values from an int64 vector. The result is merged into a float64 vector zmm1. This instruction is specifically intended for use in fixing up the results of arithmetic calculations involving one source so that they match the spec, although it is generally useful for fixing up the results of multiple-instruction sequences to reflect special-number inputs. For example, consider rcp(0). Input 0 to rcp, and the result should be INF. However, evaluating rcp via Newton-Raphson, where x=approx(1/0), yields an incorrect result. To deal with this, FIXUPIMM can be used after the N-R reciprocal sequence to set the result to the correct value (i.e. INF when the input is 0). Denormal input operands, zmm1 or zmm2, are considered as normal inputs and do not trigger any fixup nor fault reporting.

In an embodiment, the BLENDSEM AND FIXUPIMM instructions are executed on a different functional unit, referred to as the "shuffle" functional unit.

RCP14 and RSQRT14

The RCP14 instruction performs a SIMD computation of the approximate reciprocals of the four/two packed double-precision floating-point values in the source operand (second operand) stores the packed double-precision floating-point results in the destination operand. The maximum relative error for this approximation is less than $2^{-14}$. The source operand can be an ZMM register or a 512-bit memory location. The destination operand is an ZMM register. The RCP14PD instruction is not affected by rounding control bits. When a source value is a 0.0, an ∞ with the sign of the source value is returned. When a source value is a SNaN or QNaN, the SNaN is converted to a QNaN or the source QNaN is returned.

This RSQRT14 instruction performs a SIMD computation of the approximate reciprocals of the square roots of the eight packed double-precision floating-point values in the source operand (second operand) and stores the packed double-precision floating-point results in the destination operand. The maximum relative error for this approximation is less than $2^{-14}$. The source operand can be an ZMM register or a 512-bit memory location. The destination operand is an ZMM register. The RSQRT14PD instruction is not affected by rounding control bits. When a source value is a 0.0, an ∞ with the sign of the source value is returned. When the source operand is an ∞, zero with the sign of the source value is returned. When a source value is a negative value (other than 0.0) a floating-point indefinite is returned. When a source value is an SNaN or QNaN, the SNaN is converted to a QNaN or the source QNaN is returned.

In an embodiment, the VRCP14 AND VRSQRT14 instructions are executed on another different functional unit, referred to as the "PFPROMS" functional unit.

A processor having the functionality described above can be implemented into various computing systems as well. FIG. 9 shows an embodiment of a computing system (e.g., a computer). The exemplary computing system of FIG. 9 includes: 1) one or more processors 901 that may be design to include a vector logical reduction instruction; 2) a memory control hub (MCH) 902; 3) a system memory 903 (of which different types exist such as DDR RAM, EDO RAM, etc,); 4) a cache 904; 5) an I/O control hub (ICH) 905; 6) a graphics processor 906; 7) a display/screen 907 (of which different types exist such as Cathode Ray Tube (CRT), flat panel, Thin Film Transistor (TFT), Liquid Crystal Display (LCD), DPL, etc.) one or more I/O devices 908. The computing system may also include a hard disk drive (not shown).

The one or more processors 901 execute instructions in order to perform whatever software routines the computing system implements. The instructions frequently involve some sort of operation performed upon data. Both data and instructions are stored in system memory 903 and cache 904. Cache 904 is typically designed to have shorter latency times than system memory 903. For example, cache 904 might be integrated onto the same silicon chip(s) as the processor(s) and/or constructed with faster SRAM cells whilst system memory 903 might be constructed with slower DRAM cells. By tending to store more frequently used instructions and data in the cache 904 as opposed to the system memory 903, the overall performance efficiency of the computing system improves.

System memory 903 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 903 prior to their being operated upon by the one or more processor(s) 901 in the implementation of a software program. Similarly, data that a software program determines should be sent from the computing system to an outside entity through one of the computing system interfaces, or stored into an internal storage element, is often temporarily queued in system memory 903 prior to its being transmitted or stored.

The ICH 905 is responsible for ensuring that such data is properly passed between the system memory 903 and its appropriate corresponding computing system interface (and internal storage device if the computing system is so designed). The MCH 902 is responsible for managing the various contending requests for system memory 903 access amongst the processor(s) 901, interfaces and internal storage elements that may proximately arise in time with respect to one another.

One or more I/O devices 908 are also implemented in a typical computing system. I/O devices generally are responsible for transferring data to and/or from the computing system (e.g., a networking adapter); or, for large scale non-volatile storage within the computing system (e.g., hard disk drive). ICH 905 has bi-directional point-to-point links between itself and the observed I/O devices 908.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A processor comprising:
a decode unit to decode a first instruction, the first instruction to indicate a first floating point term X and a second term Y; and
an execution unit to execute the first instruction, the execution unit including:
at least an exponent calculation logic and a mantissa calculation logic, to scale the first floating point term X by an integer associated with the second term Y to generate a floating point result R, wherein the floating point result R is equal to the first floating point term X multiplied by two raised to a power of the integer associated with the second term Y; and
write logic circuitry to store the floating point result R.

2. The processor of claim 1, wherein a mantissa of the floating point result R is equal to a mantissa of the first floating point term X, and an exponent of the floating point result R is equal to an exponent of the first floating point term X plus the integer associated with the second term Y.

3. The processor of claim 1, wherein the floating point result R has a binary point of the first floating point term X moved by the integer associated with the second term Y.

4. The processor of claim 1, wherein the execution unit comprises a masking layer.

5. The processor of claim 2, wherein the floating point result R is part of a packed operand, and comprising a masking layer to present arithmetic exceptions that occur for valid floating point results of the packed operand and is to suppress presenting arithmetic exceptions that occur for floating point results of the packed operand that are not valid.

6. The processor of claim 1, wherein the first floating point term X is a scalar single precision floating point term.

7. The processor of claim 1, wherein the first floating point term X is a scalar double precision floating point term.

8. The processor of claim 1, wherein the first floating point term X is one of a plurality of single precision floating point terms in a packed operand.

9. The processor of claim 1, wherein the first floating point term X is one of a plurality of double precision floating point terms in a packed operand.

10. The processor of claim 1, wherein the decode unit and the execution unit are disposed on a semiconductor chip.

11. The processor of claim 1, wherein the processor is a Complex Instruction Set (CISC) architecture processor.

* * * * *